United States Patent [19]

King

[11] Patent Number: 4,903,492

[45] Date of Patent: Feb. 27, 1990

[54] DILUTION AIR DISPENSING APPARATUS

[75] Inventor: Robert C. King, El Paso, Tex.

[73] Assignee: The United States of America as represented by the Secretary of the Air Force, Washington, D.C.

[21] Appl. No.: 246,137

[22] Filed: Sep. 7, 1988

[51] Int. Cl.⁴ ............................................... F02C 1/00
[52] U.S. Cl. .................................... 60/733; 60/732; 60/737
[58] Field of Search ............ 60/733, 732, 737, 39.36, 60/39.37

[56] References Cited

U.S. PATENT DOCUMENTS

| | | | |
|---|---|---|---|
| 2,606,421 | 8/1952 | Goddard | 60/39.69 |
| 3,306,333 | 2/1967 | Mock | 158/4 |
| 3,820,324 | 6/1974 | Grindley et al. | 60/39.74 R |
| 3,851,465 | 12/1974 | Verdouw | 60/39.36 |
| 4,113,425 | 9/1978 | von Linde et al. | 431/352 |
| 4,173,118 | 11/1979 | Kawaguchi | 60/39.65 |
| 4,195,475 | 4/1980 | Verdouw | 60/754 |
| 4,237,694 | 12/1980 | Wood et al. | 60/738 |

Primary Examiner—Donald P. Walsh
Attorney, Agent, or Firm—William Stepanishen; Donald J. Singer

[57] ABSTRACT

A dilution air dispensing apparatus for a double dome combustor with dilution air dispensing holes that are staggered on the opposite walls of the centerbody. The wakes on the downstream side of the jets provide avenues of access for the deflected combustion gases to continue their travel across the combustor and into the regions downstream of the opposite domes. The gases then mix with the remaining undeflected gases from the domes and with the spent dilution air before reaching a combustor exit plane.

3 Claims, 1 Drawing Sheet

DILUTION AIR DISPENSING APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to aircraft engine combustor systems, and in particular to a dilution air dispensing apparatus for a double dome engine combustor.

The state of the art of double dome combustor apparatus is well represented and alleviated to some degree by the prior art apparatus and approaches which are contained in the following U.S. Patents:
- U.S. patent application Ser. No. 2,606,421 issued to Goddard on Aug. 12, 1952;
- U.S. patent application Ser. No. 3,306,333 issued to Mock on Feb. 28, 1967;
- U.S. patent application Ser. No. 3,820,324 issued to Grindley et al on June 28, 1974 ;
- U.S. patent application Ser. No. 3,851,465 issued to Verdouw on Dec. 3, 1974;
- U.S. patent application Ser. No. 4,113,425 issued to von Linde et al on Sept. 12, 1978;
- U.S. patent application Ser. No. 4,173,118 issued to Kawaguchi on Nov. 6, 1979;
- U.S. patent application Ser. No. 4,195,475 issued to Verdouw on Apr. 1, 1980; and
- U.S. patent application Ser. No. 4,237,694 issued to Wood et al on Dec. 9, 1980.

Kawaguchi patent discloses a fuel combustion cylinder having a double concentric combustion cylinder which includes a rich mixture zone, a lean mixture zone and a dilution zone.

Mock patent is directed to a combustor of the flame tube type and toroidal or smoke ring type of gas circulation in the primary zone.

Wood et al patent describes a combustor for a gas turbine engine which has a central duct partially surrounded by an annular duct. Each duct has an array of swirl vanes at their upstream ends and fuel inlet apertures are located downstream of the respective arrays of swirl vanes.

Verdouw, Grindley et al, von Linde et al, Verdouw and Goddard patents provide additional background information on the state of the field of art.

In the prior art, designers of advanced combustor engines were striving to reduce the combustor length as one of several means for reducing engine length and weight. The double dome combustor had been introduced in advanced designs as a means of reducing combustor length while meeting other important design criteria. However, preliminary studies have indicated that in these short double dome combustor designs, some amount of centerbody dilution air is needed. This additional centerbody dilution air with the dilution from the combustor inner and outer walls provides cooling to the center portion of the combustor exit stream, and is also necessary to achieve the desired temperature gradient variation (profile shape) cross the combustor exit stream. The circumferential variations in temperature must also be limited. However, this condition is expected to be particularly difficult due to the shortness of the combustor and the very limited length which is available for mixing between the location where dilution air is admitted, and the combustor exit. At some conditions, it may also be necessary to operate with fuel and combustion in only one dome. This operation would result in a very poor profile shape, which would be detrimental to combustor and turbine efficiencies. To a lesser degree, the profile and pattern factor will be sensitive to the control tolerance in setting and holding of particular fuel flow splits to the two domes.

SUMMARY OF THE INVENTION

The present invention utilizes a double dome combustor with a dispensing dilution air apparatus to enhance the mixing of adjacent streams of combustion gases as they leave their respective domes. By inclining a pair of dilution jets in a slightly downstream direction and staggering the dilution holes located on opposite walls of the centerbody, a powerful aerodynamic mixer is created. The blockage effect created by the inclined jets causes a portion of the approaching combustion gases to accelerate and to turn toward the regions downstream of the adjacent or opposite domes.

It is one object of the present invention, therefore, to provide an improved dilution air dispensing apparatus.

It is another object of the invention to provide an improved dilution air dispensing apparatus wherein the mixing of adjacent streams of combustion gas from the double dome combustor is enchanced.

It is still another object of the invention to provide an improved dilution air dispensing apparatus wherein an aerodynamic mixer is created by inclining a pair of dilution jets in their respective dome and by staggering dilution holes which are located on sides of the centerbody walls.

It is yet a further object of the invention to provide an improved dilution air dispensing apparatus wherein the dilution jets are inclined in a slightly downstream direction to cause the combustion gases to accelerate and turn toward the regions downstream of the adjacent or opposite domes.

It is an even further object of the present invention to provide an improved dilution air dispensing apparatus wherein the wakes on the downstream side of the jets create access avenues for deflected gases into the downstream regions of the opposite dome.

These and other advantages, objects and features of the invention will become more apparent after considering the following description taken in conjunction with the illustrative embodiment in the accompanying drawings.

DETAILED DESCRIPTION OF THE PREFERRED EMBODIMENT

Figure 1B:
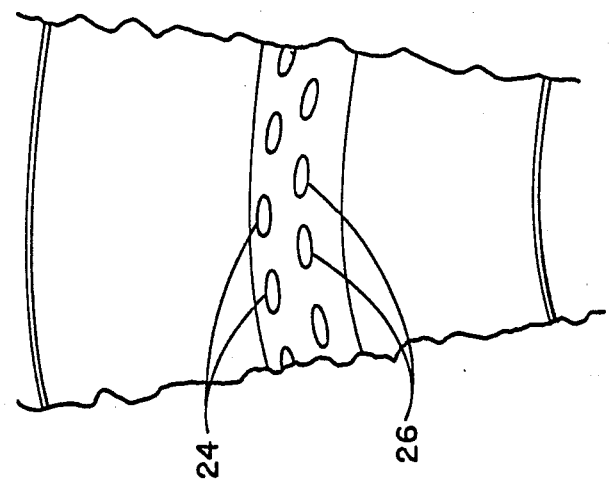
FIG. 1b is a detailed sectional view along line A—A of FIG. 1a of the dilution air dispensing apparatus.
Figure 1A:
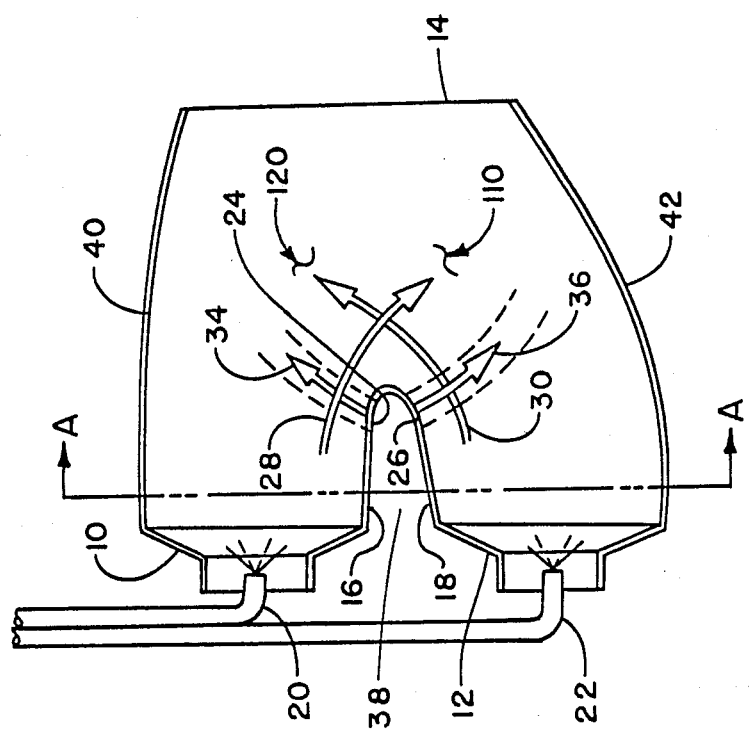
FIG. 1a is a cross-sectional view of a double dome combustor utilizing the dilution air dispensing apparatus according to the present invention.

Referring now to FIG. 1a, there is shown a cross-sectional view of a double dome combustor with a dispensing dilution air apparatus incorporated therein. The double dome combustor comprises a first dome 10 and a second dome 12 which blend to a common exit opening 14. The first and second domes 10, 12 are joined at their lower and upper dome walls, respectively, by centerbody walls 16, 18. A pair of fuel nozzles 20, 22 are arranged to provide fuel to their respective combustor dome. A number of dilution holes 24, 26 are located at the rearmost section of the centerbody walls 16, 18. In FIG. 1b, there is shown in greater detail the arrangement and position of the dilution holes 24, 26. FIG. 1b is a cross-sectional view of FIG. 1a and is taken along the line A—A. The combustion gases 28 from the first dome 10 travel along the path indicated in FIG. 1a. The combustion gases 30 from the second dome 12 travel along a similar path which is directed toward the exit portion of the first dome. Dilution gases 34, 36 from the centerbody cavity 38 pass through the dilution holes 24, 26 and respectively travel towards the outer walls 40, 42 of the first and second dome 10, 12.

The purpose of this invention is to provide a preferred and efficient apparatus for the dispensing of dilution air from the centerbody walls 16 and 18 of a double dome combustor as shown in FIG. 1a. The centerbody dilution air dispenser enhances the mixing of the adjacent streams of the combustion gases 28 and 30 as they leave their respective domes 10 and 12. The dilution holes 24 and 26 respectively incline the path of the dilution gases 34 and 36 in a slightly downstream direction. It should be noted that by staggering the dilution holes 24 and 26 which are located on the opposite walls 16 and 18 of the centerbody dilution air dispenser, a powerful aerodynamic mixer is created. The blockage effect that is created by the inclined path of the dilution gases 34 and 36 causes a portion of the approaching combustion gases 28 and 30 to accelerate and to turn toward the regions 110 and 120 which are downstream of the adjacent or opposite domes. With the staggered dilution arrangement, the wakes on the downstream side of the dilution gases 34 and 36 provide avenues of access for the deflected combustion gases 28 and 30 to continue their travel across the combustor and into the regions 110 and 120 which are downstream of the opposite domes. The gases 28 and 30 then mix with the remaining undeflected gases from domes 10 and 12, and with the spent dilution air before reaching the combustor exit plane 14. The mechanics of operation is similar to the mixing chutes that are used in mixed flow augmented turbofans, but the present invention utilizes the aerodynamic path of the dilution gases 34 and 36 instead of mechanical chutes to form the mixer. The benefits of increased mixing of flows from the two domes include reduced pattern factor and a more stable profile shape, both of which are less sensitive to variations in fuel flow splits between the two domes. With the conventional arrangement of dilution jets that are not staggered on opposite sides of the centerbody dilution air dispenser, there is substantially less tendency for combustion gases from the two domes to intermix with one another.

Although the invention has been described with reference to a particular embodiment, it will be understood to those skilled in the art that the invention is capable of a variety of alternative embodiments within the spirit and scope of the appended claims.

What is claimed is:

1. A dilution air dispensing apparatus for a double dome combustor comprising in combination:

a first dome combustor having an inlet opening and an exhaust opening, a first fuel nozzle operatively arranged in said inlet opening to dispense fuel to said first dome combustor, a second dome combustor having an inlet opening and an exhaust opening, a second fuel nozzle operatively arranged in said inlet opening to dispense fuel to said second dome combustor, said first and second dome combustor being joined towards their inlet ends to form a dilution air dispensing cavity therebetween, said dilution air dispensing cavity being formed by the inner adjacent walls of said first and second dome combustors, said dilution air dispensing cavity having a rearward portion which is located approximately one-third of the dome length from the inlets to said first and second dome combustors, first and second rows of dilution holes are formed in the adjacent inner walls of said dilution air dispensing cavity, said first and second rows of dilution holes being located in said rearward portion of said dilution air dispensing cavity and being staggered with respect to each other, said dilution holes admitting dilution air respectively to said first and second dome combustors, said dilution air respectively altering the paths of combustion gas flow in said first and second dome combustors toward the opposite combustor dome exhaust opening.

2. A dilution air dispensing apparatus as described in claim 1 wherein said dilution holes are elliptical.

3. A dilution air dispensing apparatus as described in claim 1 wherein said dilution holes create dilution air jets which are inclined in a slightly downstream direction to cause the combustion gases to accelerate and to turn toward the regions downstream of the opposite combustor dome.

* * * * *